(12) United States Patent
Dorner et al.

(10) Patent No.: US 7,811,004 B2
(45) Date of Patent: Oct. 12, 2010

(54) SHAFT BEARING SEAL

(75) Inventors: Stefan Dorner, Kaufbeuren (DE); Markus Hartmann, Mauerstetten (DE); Herbert Rehm, Puergen (DE)

(73) Assignee: Hilti Aktiengesellschaft, Schaan (LI)

( * ) Notice: Subject to any disclaimer, the term of this patent is extended or adjusted under 35 U.S.C. 154(b) by 407 days.

(21) Appl. No.: 11/901,842

(22) Filed: Sep. 18, 2007

(65) Prior Publication Data
US 2008/0075401 A1 Mar. 27, 2008

(30) Foreign Application Priority Data
Sep. 20, 2006 (DE) .................. 10 2006 000 469

(51) Int. Cl.
*F16C 33/72* (2006.01)
*F16C 33/76* (2006.01)
(52) U.S. Cl. .................. 384/477; 384/484; 384/488
(58) Field of Classification Search .............. 384/140, 384/144, 477–478, 480, 482, 484–486, 489, 384/488; 310/67 R, 90, 99.08; 277/351, 277/412, 562
See application file for complete search history.

(56) References Cited
U.S. PATENT DOCUMENTS

| | | | | |
|---|---|---|---|---|
| 2,622,944 A | * | 12/1952 | Bergstrom | .............. 384/489 |
| 3,447,843 A | * | 6/1969 | Shipman | .............. 384/144 |
| 3,770,993 A | * | 11/1973 | Schultenkamper | .......... 384/484 |
| 4,592,666 A | * | 6/1986 | Jornhagen | .............. 384/477 |
| 4,875,786 A | * | 10/1989 | DeWachter | .............. 384/482 |
| 5,011,165 A | * | 4/1991 | Cap | .............. 384/133 |
| 5,028,054 A | * | 7/1991 | Peach | .............. 277/348 |
| 5,061,868 A | * | 10/1991 | Iwazaki et al. | .............. 310/67 R |
| 5,227,686 A | * | 7/1993 | Ogawa | .............. 310/90 |
| 5,387,040 A | * | 2/1995 | Firestone et al. | .............. 384/484 |
| 5,821,646 A | * | 10/1998 | Chuta et al. | .............. 310/67 R |
| 5,908,248 A | * | 6/1999 | Nisley | .............. 384/140 |
| 6,623,165 B1 | * | 9/2003 | Akagami et al. | .............. 384/478 |
| 2004/0175065 A1 | * | 9/2004 | Nguyen | .............. 384/480 |

FOREIGN PATENT DOCUMENTS

DE 3708815 C1 * 9/1988
FR 2164321 A * 10/1975

* cited by examiner

*Primary Examiner*—Marcus Charles
(74) *Attorney, Agent, or Firm*—Abelman, Frayne & Schwab

(57) ABSTRACT

A seal (2) for a bearing (6) that rotatably supports a shaft (14) extending through a housing opening (8) of a housing element (10) that limits, at least partially, a lubricant-receiving chamber (4), includes a sealing ring (26) retainable between the housing element (10) and the shaft (14) and forming together with a limiting element (28) an annular gap (30), and having aeration recesses (34) which connect the annular gap (30) with the grease-containing chamber (4).

7 Claims, 4 Drawing Sheets

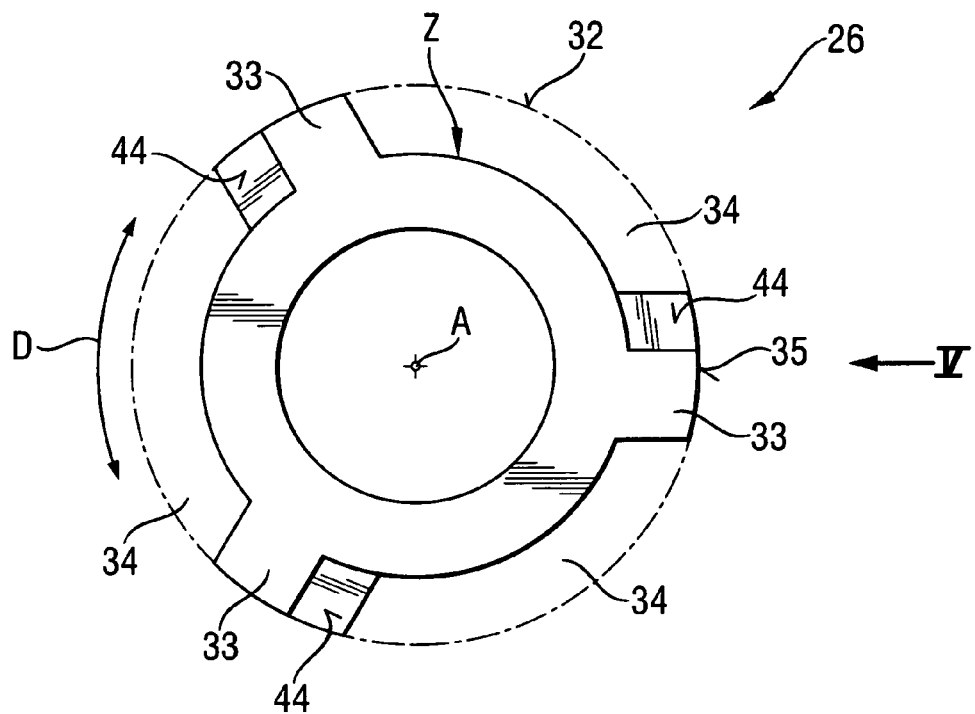
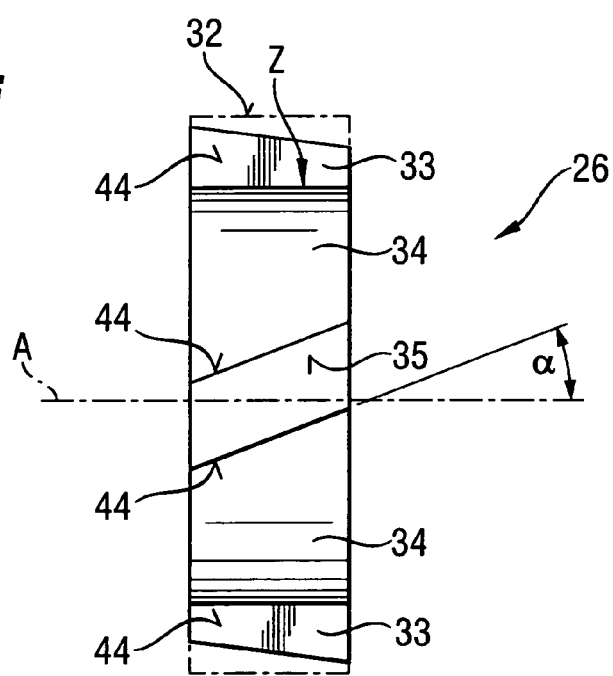

SHAFT BEARING SEAL

BACKGROUND OF THE INVENTION

1. Field of the Invention

The present invention relates to a seal for a bearing that rotatably supports a shaft. The shaft extends through a housing opening of a housing element that limits, at least partially, a chamber containing a lubricant in form of a lubricating grease or oil. Between the lubricant-containing chamber and the bearing, there is provided a sealing ring that surrounds the shaft and is retained between the shaft and the housing element for protecting the bearing from the lubricant. The sealing ring forms, together with a limiting element, an annular gap.

2. Description of the Prior Art

The seals of the type descried above, are provided, e.g., on lubricant-receiving chambers or receptacles for gear units of, e.g., hand-held power tools. The sealing ring prevents the lubricant, which is provided in the associated gear housing, from directly contacting the bearing and from flowing through the bearing from the gear housing outwardly, e.g., into a motor housing.

European Patent EP 0 202 702 B1 discloses a seal for a shaft bearing and which includes a swivel ring connected with the shaft for a joint rotation therewith. The swivel ring forms a hub which extends radially outwardly and forms, together with a hub fixedly connected with the housing and extending from the housing opening radially inwardly, an annular gap. This annular gap has a labyrinth-shaped cross-section.

U.S. Pat. No. 5,876,126 discloses a shaft bearing seal that has a sealing disc retained on an outer ring of the bearing which is fixedly secured to the housing. The sealing disc forms, together with a shaft and a bearing inner ring press-fitted on the shaft, a labyrinth-shaped annular gap.

The drawback of the known shaft bearing seals consists in that despite the labyrinth-shaped annular gap, in particular at a vertical orientation of the shaft, the lubricant reaches the bearing and can leave the lubricant-receiving chamber through the bearing.

Such seals are not suitable for hand-held power tools which, e.g., are often used in overhead works and have the shaft oriented vertically for an extended time period in an operational or shut-down condition of the power tool when no lubricant should flow through the shaft bearing.

Accordingly, an object of the present invention is to provide a shaft bearing seal suitable for hand-held power tools and in which the above-mentioned drawback of the known shaft bearing seals is eliminated, and the bearing is better protected from the lubricant such as grease.

SUMMARY OF THE INVENTION

This and other objects of the present invention, which will become apparent hereinafter, are achieved according to the present invention by providing a shaft bearing seal of the type discussed above and in which the sealing ring has aeration recesses which connect the annular gap with the lubricant containing chamber. The aeration recesses permit to remove the lubricant, which penetrated in the annular gap during the operation or shut-down of the power tool as a result of a vertical orientation of the bearing, from the annular gap. To this end, a dynamic effect is used which is produced by a rotation of the sealing ring that limits the annular gap on one side, relative to another limitation that limits the annular gap on the second side. The sealing ring can be fixedly connected, e.g., with the shaft for joint rotation therewith, and the limiting element can be fixedly secured to the housing element or vice versa. The aeration recesses aerate the annular gap. The aeration of the annular gap during operation prevents development of underpressure in the annular gap that can cause an aspiration of lubricant in the annular gap or its retention there.

According to a particular advantageous embodiment of the present invention, the sealing ring is formed by an impeller-like disc connectable with the shaft for a joint rotation therewith, and the limiting element is fixedly connected with the housing element. During an operation, the sealing ring rotates together with the shaft, accelerating the lubricant accumulated on the sealing ring. Thereby, in particular with a suitable shape of the sealing ring, the lubricant can be particularly effectively forced out of the annular gap.

Advantageously, the annular gap is formed between a radially outer rotational surface of the sealing ring and the limiting element. This insures a maximum acceleration of the lubricant that accumulated on the sealing ring during operation. This further optimizes removal of the lubricant from the annular gap.

Advantageously, the aeration recesses open into the rotational surface of the sealing ring, which insures a particularly good aeration of the annular gap and, thus, an unobstructed delivery of the lubricant out of the annular gap.

Preferably, the aeration recesses are substantially identical and are spaced from each other by a same angular distance. This insures a uniform removal of the lubricant over the sealing ring circumference.

Advantageously, there are provided at least three aeration recesses. This permits to achieve a particularly high delivery output of the sealing ring with respect to the lubricant in the annular gap.

Preferably, the aeration recesses extend from a lubricant containing chamber side end surface of the sealing ring to a bearing-side end surface of the sealing ring. Thereby, the aeration of the annular gap takes place over the entire width of the rotational surface. In addition, thereby, even the region of the annular gap, which is limited by the bearing-side end surface of the sealing ring remote from the lubricant-containing chamber, is aerated.

It is further particular advantageous when the aeration recesses extend radially inwardly up to a virtual cylinder a diameter (dZ) of which is smaller than an outer diameter of an inner ring of the bearing. Thereby, the side of the bearing adjacent to the lubricant-containing chamber can be completely aerated in the region between the shaft-side inner ring of the bearing and the outer ring of the bearing fixed to the housing. In this region, because of the insufficient sealing, the lubricant exits from the lubricant exits from the lubricant-containing chamber. Complement aeration prevents underpressure in this region. Therefore, with a suitable shape of the sealing ring, in this region also, a substantially complete removal of the lubricant is possible.

Advantageously, the aeration recesses extend over from 70% to 95% of a sealing ring circumference, and an acceleration element is formed between each two adjacent aeration recesses. With this propeller-shaped design of the sealing ring a particularly high delivery output with respect to the annular gap is achieved.

It is advantageous when the acceleration element has a side surface adjacent to a rotational direction and inclined toward a bearing axis at an angle. This likewise increases the delivery output.

Advantageously, the acceleration element alternatively or in addition is inclined toward the bearing axis at the rotational surface of the sealing element, at an angle. In this way, the sealing ring forms, during an operation, a conical rotational body, and an improved lubricant delivery takes place over the circumference of the sealing ring.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 4 a plan view of another embodiment of the sealing disc of the shaft bearing seal according to the present invention;

FIG. 5 a side view of the sealing disc according to FIG. 4 in direction of arrow V;

DETAILED DESCRIPTION OF THE PREFERRED EMBODIMENTS

Figure 1:
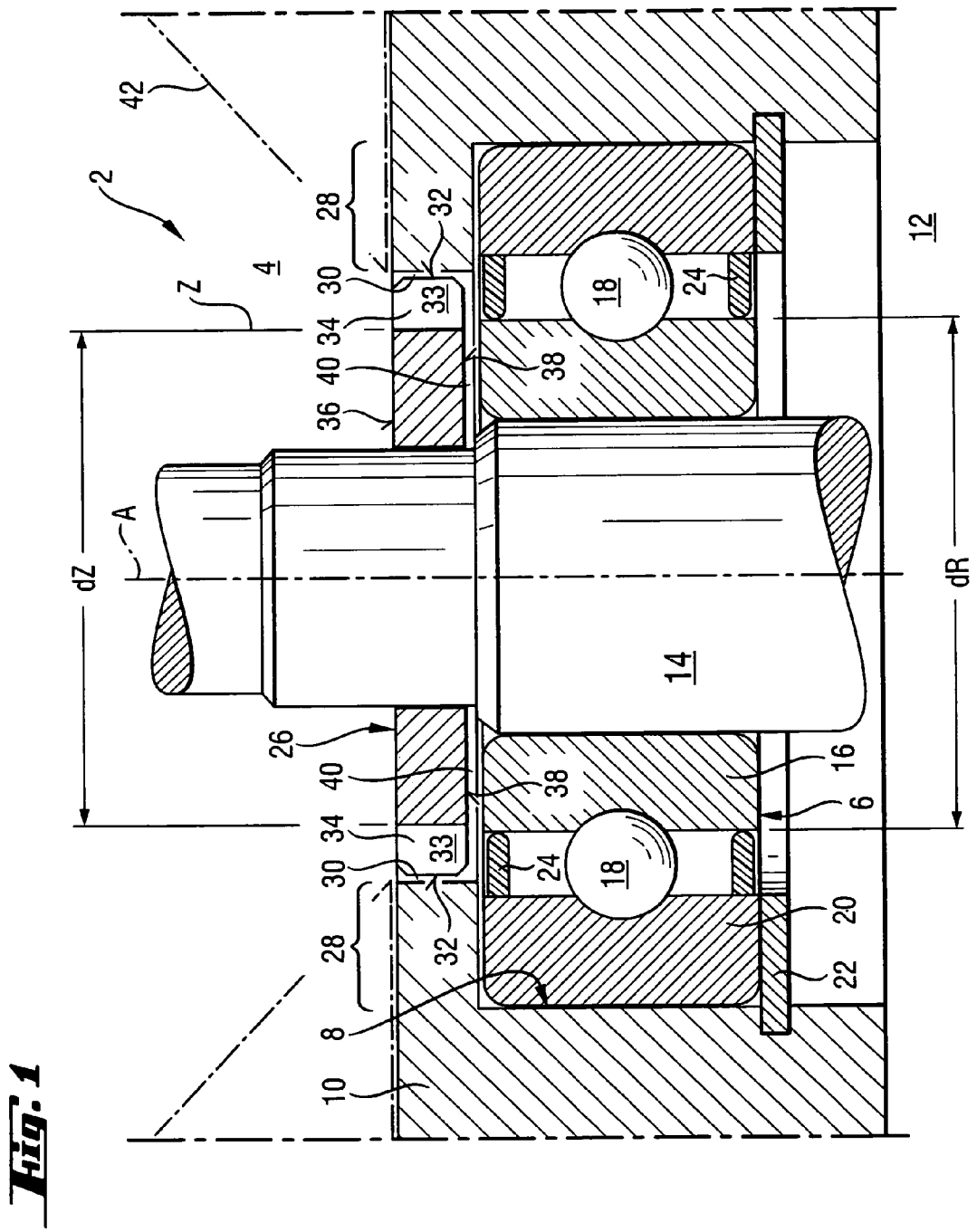
FIG. 1 a partially cross-sectional view of a shaft bearing seal according to the present invention.

FIG. 1 shows a shaft bearing seal 2 which is provided on a grease-containing chamber 4 of a gear housing, not shown in detail, of a hand-held power tool, e.g., in form of a hammer drill or a screw driving tool. The shaft bearing seal 2 is provided on a bearing 6 that is retained in the housing opening 8 of a wall-shaped housing element 10. The housing element 10 separates the grease-containing chamber 4 from an outer chamber 12 of a motor housing, not shown in detail.

The bearing 6 serves for supporting a shaft 14 for rotation about an axis A. The shaft 14 projects from the outer chamber 12 into the grease-receiving chamber 4. The bearing 6 has an inner ring 16 which, e.g., is press fit-mounted on the shaft 14 for joint rotation therewith. The inner ring 16 is rotated relative an outer ring 20 of the bearing 6 by a ball-shaped bearing body 18. The outer-ring 20 is held fixedly in the housing element 10 and is axially secured with a circlip 22. Between the inner ring 16 and the outer ring 20, there are provided sealing elements 24.

On the shaft 14, there is further provided a sealing disc 26 in form of an impeller-like disc that, e.g., is connected with shaft 14 by a press fit for joint rotation therewith. The sealing disc 26 is held, with respect to the axis A, at an axial height of a limiting element 28 that is formed by a collar section of the housing element 10, which projects radially inwardly in the housing opening 8. A circumferential rotational surface 32, which is defined by radially outer surfaces of the sealing disc 26, and the limiting element 28 form an annular gap 30.

Figure 2:
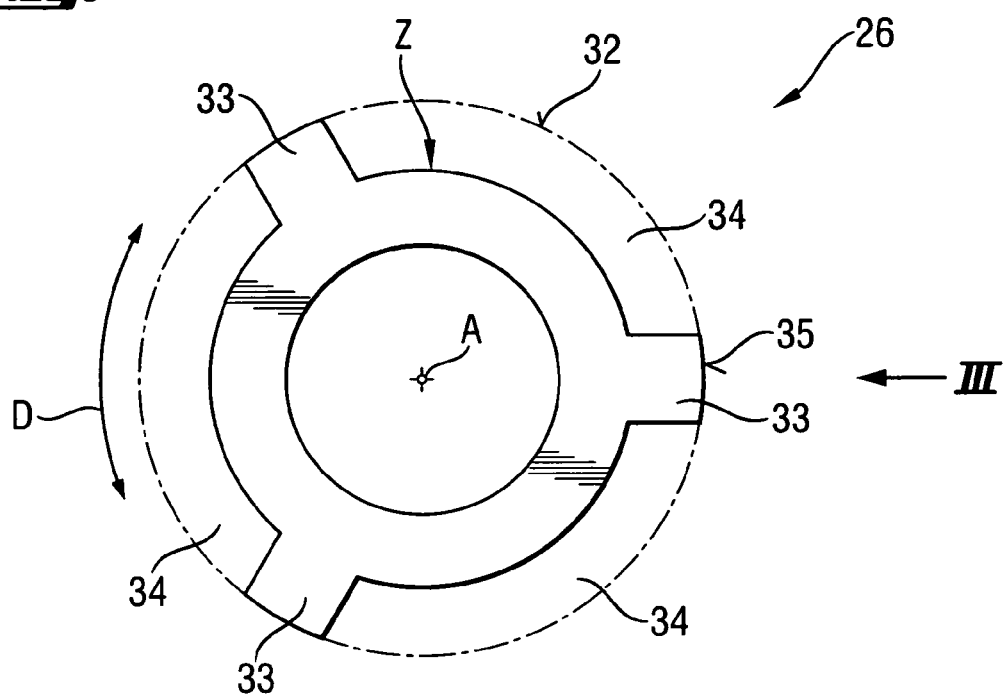
FIG. 2 a plan view of the sealing disc of the shaft bearing seal according to FIG. 1.
Figure 3:
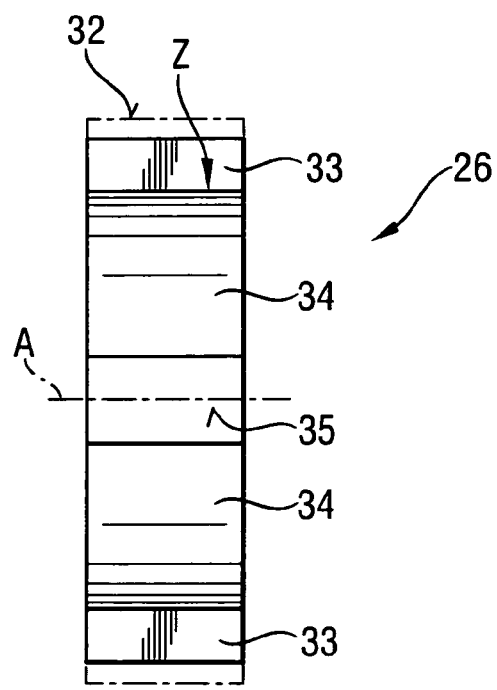
FIG. 3 a side view of the sealing disc according to FIG. 2 in direction of arrow III.

As shown in FIGS. 2-3, the sealing disc 26 has three acceleration elements 33 which are separated from each other by aeration recesses 34. The aeration recesses 34 extend over more than 90° of the rotational surface 32. The acceleration elements 33 form radially outer circumferential surfaces 35 which define the rotational surface 32.

Alternatively, the aeration recesses 34 can be formed by a multiplicity of smaller grooves which can be formed on the circumference of the sealing disc 26 (not shown). In each case, the rotational surface 32 is formed by the radially outer surfaces 36 of the sealing disc 26 which upon rotation of the sealing disc 26 in a direction D, form an outer cylindrical surface of the corresponding rotational body.

The aeration recesses 34 and thus, the acceleration elements 33 extend, as shown in FIG. 1, over an entire width of the sealing disc 26 from a chamber-side end surface 36 adjacent to the grease-receiving chamber 4 to a bearing-side end surface 28 adjacent to the bearing 6.

As shown in FIG. 1, the aeration recesses 34 extend radially inwardly up to a common virtual cylinder Z having a diameter dZ. The diameter dZ is smaller than the outer diameter dR of the inner ring 16 of the bearing 6.

When the respective hand-held power tool is operated or is shut down and the shaft 14 is so aligned that it extends, as shown in FIG. 4, vertically, the grease can flow from the grease-receiving chamber 4 into the annular gap 30 between the sealing disc 26 and the limiting element 28 and through the annular gap 30 into an intermediate chamber 40 between the sealing disc 26 and the bearing 6. As a result, the grease directly contacts the sealing elements 24.

As soon as the shaft 14 begins to rotate about the axis A, the grease would be accelerated in the annular gap 30 and in the intermediate chamber 40 by the sealing disc 26 and would be transported from the annular gap 30.

The aeration recesses 34, which connect the grease-receiving chamber 4 with the annular gap 30 and the intermediate chamber 40, insure that both the annular recess 30 and at least a region of the intermediate chamber 40 that extends over the sealing elements 24, is adequately aerated. In this way, the built-up of an underpressure is prevented, and almost complete removal of grease, which accumulated on the sealing elements, is insured. At that, a grease cone 42 is formed that permanently adjoins the annular gap 30 but cannot penetrate thereinto as long as the sealing disc rotates.

FIGS. 4 through 7 show alternative embodiments of the sealing disc 26, with the elements, which perform the same functions, all having the same reference numerals as in FIGS. 1-3.

In the embodiment shown in FIGS. 4-5, the acceleration elements 33 form, with respect to the axis A, an angle ($\alpha$) on both side surfaces 44 aligned in the rotational direction D.

Figure 6:
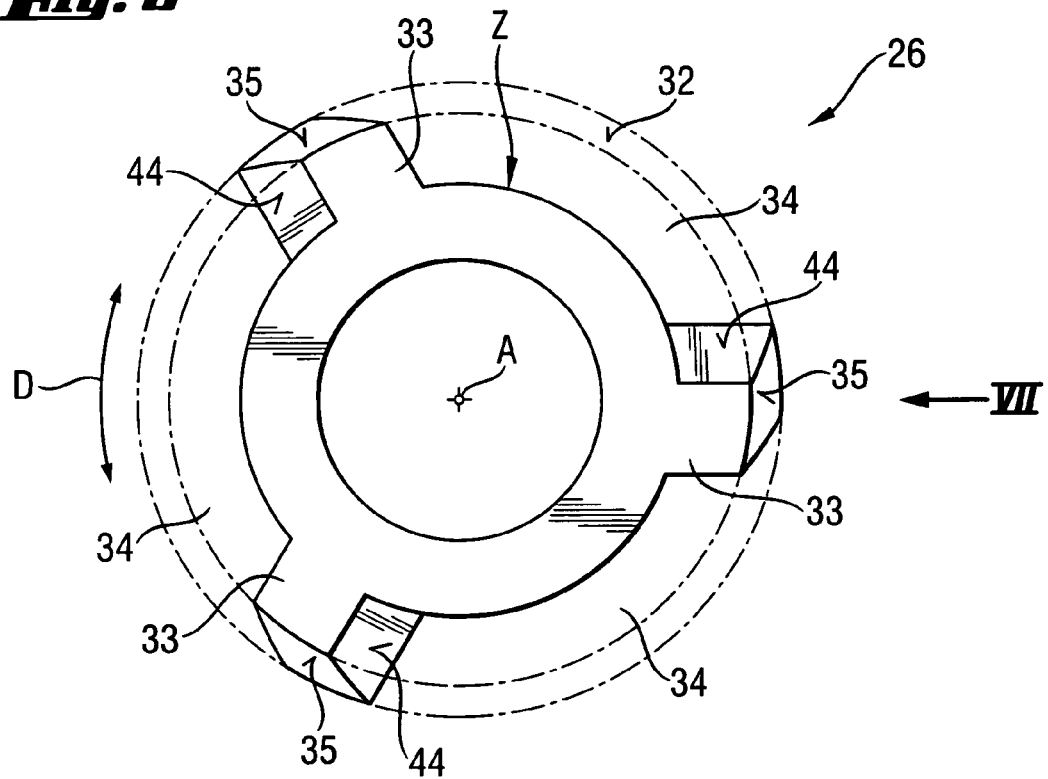
FIG. 6 a plan view of a further embodiment of the sealing disc of the shaft bearing seal according to the present invention.
Figure 7:
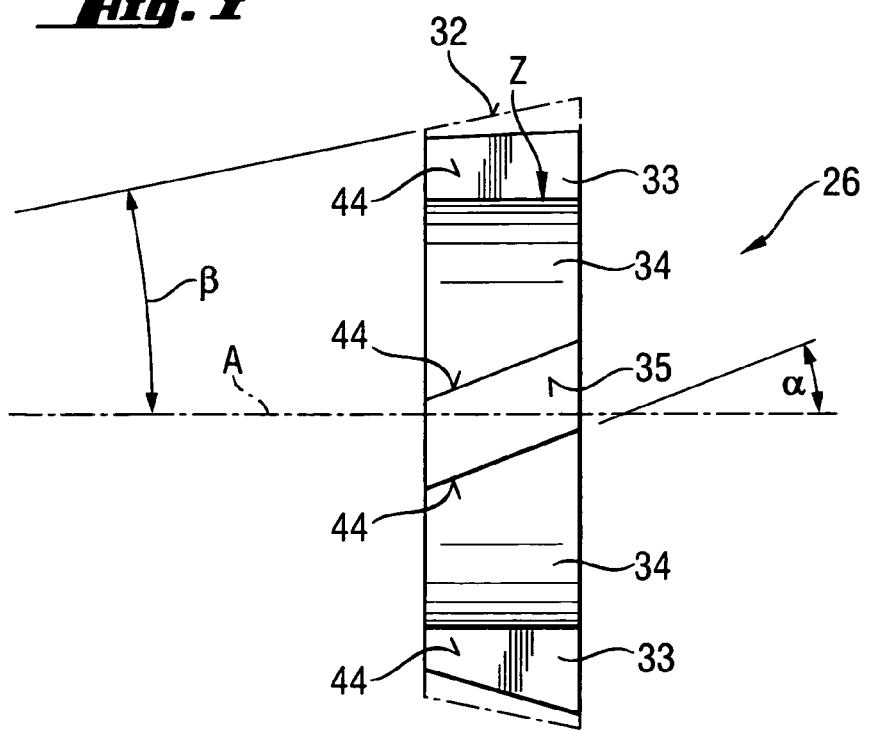
FIG. 7 a side view of the sealing disc according to FIG. 6 in direction of arrow VII.

In the embodiment of FIGS. 6 and 7, additionally, the radially outer circumferential surface 35 of the acceleration elements 33 forms, with respect to axis "A" an inclination angle ($\beta$), so that the sealing disc 26 forms, upon rotation in the rotational direction D, a conical rotational body, as shown with dash-dot lines.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A seal (2) for a bearing (6) that rotatably supports a shaft (14) extending through a housing opening (8) of a housing element (10) that limits, at least partially, a lubricant-receiving chamber (4), the seal comprising a sealing disc (26) retainable between the housing element (10) and the shaft (14); and a limiting element (28) forming, together with sealing disc (26), an annular gap (30), the sealing disc (26) having aeration recesses (34) which connect the annular gap (30) with the lubricant-receiving chamber (4), wherein the sealing disc (26) is formed by an impeller-like disc connectable with the shaft (14) for a joint rotation therewith, and wherein the limiting element (28) is fixedly connected with the housing element (10), wherein the annular gap (30) is formed between a radially outer rotational surface (32) of the sealing disc (26) and the limiting element (28), wherein the aeration recesses (34) open into the rotational surface (32) of the sealing disc (26), and wherein the aeration recesses (34) are substantially identical and are spaced from each other by a same angular distance ($\alpha$).

2. A bearing seal according to claim 1, wherein there are provided at least three aeration recesses (34).

3. A bearing seal according to claim 1, wherein the aeration recesses (34) extend from a grease-containing chamber side end surface (36) of the sealing disc (26) to a bearing-side end surface (38) of the sealing disc (26).

4. A seal (2) for a bearing (6) that rotatably supports a shaft (14) extending through a housing opening (8) of a housing element (10) that limits, at least partially, a lubricant-receiving chamber (4), the seal comprising a sealing disc (26) retainable between the housing element (10) and the shaft (14); and a limiting element (28) forming, together with sealing disc (26), an annular gap (30), the sealing disc (26) having aeration recesses (34) which connect the annular gap (30) with the lubricant-receiving chamber (4), wherein the aeration recesses (34) extend radially inwardly up to a virtual cylinder (Z) a diameter (dZ) of which is smaller than an outer diameter (dR) of an inner ring (16) of the bearing (6).

5. A seal (2) for a bearing (6) that rotatably supports a shaft (14) extending through a housing opening (8) of a housing element (10) that limits, at least partially, a lubricant-receiving chamber (4), the seal comprising a sealing disc (26) retainable between the housing element (10) and the shaft (14); and a limiting element (28) forming, together with sealing disc (26), an annular gap (30), the sealing disc (26) having aeration recesses (34) which connect the annular gap (30) with the lubricant-receiving chamber (4), wherein the sealing disc (26) is formed by an impeller-like disc connectable with the shaft (14) for a joint rotation therewith, and wherein the limiting element (28) is fixedly connected with the housing element (10), wherein the annular gap (30) is formed between a radially outer rotational surface (32) of the sealing disc (26) and the limiting element (28), wherein the aeration recesses (34) open into the rotational surface (32) of the sealing disc (26), and wherein the aeration recesses (34) extends over from 70% to 95% of a sealing disc circumference, and wherein an acceleration element (33) is formed between each two adjacent aeration recesses (34).

6. A bearing seal according to claim 5, wherein the acceleration element (33) has a side surface (44) adjacent to a rotational direction (D) and inclined toward a bearing axis (A) at an angle ($\alpha$).

7. A bearing seal according to claim 5, wherein the acceleration element (33) is inclined toward the bearing axis (A), at the rotational surface (32) of the sealing element (26), at an angle ($\beta$).

\* \* \* \* \*